US010162428B2

(12) United States Patent
Yasuno (10) Patent No.: US 10,162,428 B2
(45) Date of Patent: Dec. 25, 2018

(54) KVM SWITCH (71) Applicant: FUJITSU COMPONENT LIMITED, Tokyo (JP)

(72) Inventor: Kazuhiro Yasuno, Tokyo (JP)

(73) Assignee: FUJITSU COMPONENT LIMITED, Tokyo (JP)

( * ) Notice: Subject to any disclaimer, the term of this patent is extended or adjusted under 35 U.S.C. 154(b) by 0 days.

(21) Appl. No.: 15/529,865

(22) PCT Filed: Aug. 31, 2015

(86) PCT No.: PCT/JP2015/074695
§ 371 (c)(1),
(2) Date: May 25, 2017

(87) PCT Pub. No.: WO2016/103792
PCT Pub. Date: Jun. 30, 2016

(65) Prior Publication Data
US 2017/0269706 A1    Sep. 21, 2017

(30) Foreign Application Priority Data
Dec. 22, 2014  (JP) .................. 2014-259494

(51) Int. Cl.
G06F 3/023   (2006.01)
G09G 5/00    (2006.01)
G06F 3/00    (2006.01)

(52) U.S. Cl.
CPC ............ *G06F 3/023* (2013.01); *G06F 3/00* (2013.01); *G09G 5/00* (2013.01); *G09G 5/006* (2013.01);
(Continued)

(58) Field of Classification Search
CPC ............ G06F 3/023; G09G 5/006; G09G 2320/0247; G09G 2320/0626;
(Continued)

(56) References Cited

U.S. PATENT DOCUMENTS

2003/0035049 A1* 2/2003 Dickens ................. H04N 5/268
348/100
2003/0218578 A1* 11/2003 Ahern .................... H04B 3/145
345/2.1
(Continued)

FOREIGN PATENT DOCUMENTS

JP    9-185286    7/1997
JP    9-261620    10/1997
(Continued)

OTHER PUBLICATIONS

J-PlatPat English Language Abstract for JP 2008-129908, published on Jun. 5, 2008.
(Continued)

*Primary Examiner* — David Tung
(74) *Attorney, Agent, or Firm* — Staas & Halsey LLP (57) ABSTRACT A KVM (K: keyboard, V: Video, M: Mouse) switch connectable between a plurality of computers and a display, including: a plurality of input terminals that input analog image signals from the computers, respectively; a storage that stores an adjustment value that adjusts an image quality of each of the analog image signals for each input terminal; a processor that selects any one of the plurality of input terminals in accordance with an operation of a keyboard; and an adjustment circuit that adjusts the image quality of an analog image signal input to the selected input terminal based on the adjustment value corresponding to the selected input terminal.

5 Claims, 8 Drawing Sheets (52) U.S. Cl.
CPC ........... *G09G 2320/0247* (2013.01); *G09G 2320/0626* (2013.01); *G09G 2340/0407* (2013.01); *G09G 2340/0464* (2013.01); *G09G 2370/24* (2013.01)

(58) Field of Classification Search
CPC ... G09G 2340/0407; G09G 2340/0464; G09G 2370/24
See application file for complete search history.

(56) References Cited

U.S. PATENT DOCUMENTS

| | | | | |
|---|---|---|---|---|
| 2005/0114894 | A1* | 5/2005 | Hoerl | H04N 7/17336 725/74 |
| 2005/0246433 | A1* | 11/2005 | Carrigan | G06F 3/023 709/223 |
| 2006/0114234 | A1* | 6/2006 | Chiang | G06F 3/0227 345/168 |
| 2007/0121010 | A1 | 5/2007 | Sasaki | |
| 2008/0048975 | A1* | 2/2008 | Leibow | G06F 3/023 345/156 |
| 2008/0117172 | A1 | 5/2008 | Sakurai et al. | |

FOREIGN PATENT DOCUMENTS

| | | |
|---|---|---|
| JP | 2007-151031 | 6/2007 |
| JP | 2008-129908 | 6/2008 |
| JP | 2011-28652 | 2/2011 |
| JP | 2011-107914 | 6/2011 |
| JP | 2012-55015 | 3/2012 |

OTHER PUBLICATIONS

J-PlatPat English Language Abstract for JP 2011-107914, published on Jun. 2, 2011.
J-PlatPat English Language Abstract for JP 2011-028652, published on Feb. 10, 2011.
J-PlatPat English Language Abstract for JP 09-185286, published on Jul. 15, 1997.
J-PlatPat English Language Abstract for JP 09-261620, published on Oct. 3, 1997.
J-PlatPat English Language Abstract for JP 2007-151031, published on Jun. 14, 2007.
J-PlatPat English Language Abstract for JP 2012-055015, published on Mar. 15, 2012.
International Search Report for PCT/JP2015/074695, dated Nov. 24, 2015.
Extended European Search Report dated Jun. 29, 2018, in corresponding European Patent Application No. 15872361.9, 8 pgs.

* cited by examiner

| | SCREEN RESOLUTION | ADJUSTMENT VALUE (BRIGHTNESS, POSITION, PHASE, SYNC TH.) |
|---|---|---|
| FOR ANALOG IMAGE INPUT TERMINAL 24A | 1024 × 768dot | (a1, a2, a3, a4) |
| | 1280 × 1024dot | (b1, b2, b3, b4) |
| | 1920 × 1080dot | (c1, c2, c3, c4) |
| | ⋮ | ⋮ |
| FOR ANALOG IMAGE INPUT TERMINAL 24B | 1024 × 768dot | (d1, d2, d3, d4) |
| | 1280 × 1024dot | (e1, e2, e3, e4) |
| | 1920 × 1080dot | (f1, f2, f3, f4) |
| | ⋮ | ⋮ |

FIG. 6A

```
        IMAGE QUALITY SETTING
 1  <SERVER NAME>
 VIDEO INPUT              :DVI-A
 ANALOG VIDEO SETTING
   AUTO PHASE ADJUST
   AUTO SIZE
   BRIGHTNESS             50
   POSITION               (50, 50)
   PHASE                  50
   HSYNC TH.              4
 FACTORY RESET
 INFORMATION

ARW: SELECT      ESC: EXIT
ENT: SET
 S : SAVE
```

FIG. 6B

| ITEM | FUNCTION | SETTING VALUE |
|---|---|---|
| AUTO PHASE ADJUST | AUTOMATIC ADJUSTMENT OF PHASE VALUE | — |
| AUTO SIZE | AUTOMATIC ADJUSTMENT OF POSITION VALUE | — |
| BRIGHTNESS | ADJUSTMENT OF BRIGHTNESS OF IMAGE | 0~100, INITIAL VALUE=50 |
| POSITION | ADJUSTMENT OF DISPLAY POSITION OF IMAGE | 0~100, INITIAL VALUE = DEPEND ON RESOLUTION |
| PHASE | ADJUSTMENT OF BLUR AND FLICKER OF IMAGE | 0~100, INITIAL VALUE = DEPEND ON RESOLUTION |
| HSYNC TH. | ADJUSTMENT OF DETECTION LEVEL OF HORIZONTAL SYNCHRONIZING SIGNAL | 0~15, INITIAL VALUE=4 |
| FACTORY RESET | RETURN ABOVE-MENTIONED SETTING VALUES TO FACTORY SHIPMENT STATE | — |
| INFORMATION | DISPLAY OF RESOLUTION AND REFRESH RATE | — |

KVM SWITCH

CROSS-REFERENCE TO RELATED APPLICATIONS

This application is a U.S. National Stage Application, which claims the benefit under 35 U.S.C. § 371 of PCT International Patent Application No. PCT/JP2015/074695, filed Aug. 31, 2015, which claims the foreign priority benefit under 35 U.S.C. § 119 of Japanese Patent Application No. 2014-259494, filed Dec. 22, 2014.

TECHNICAL FIELD

The present invention relates to a KVM switch.

BACKGROUND ART

Figure 1A:
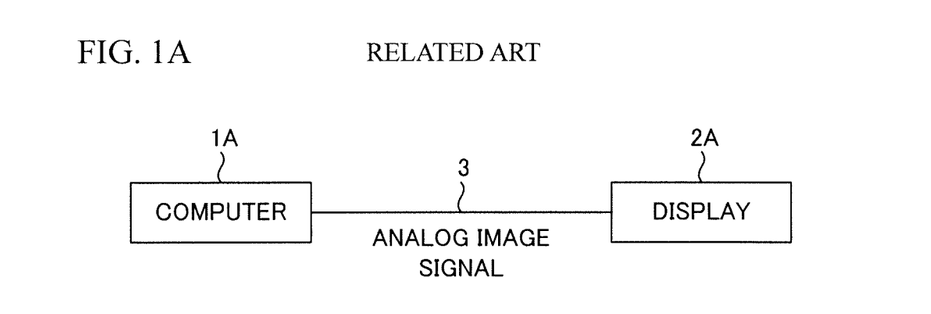
FIGS. 1A and 1B are diagrams illustrating the configuration of a system including a computer and a display.
Figure 1B:
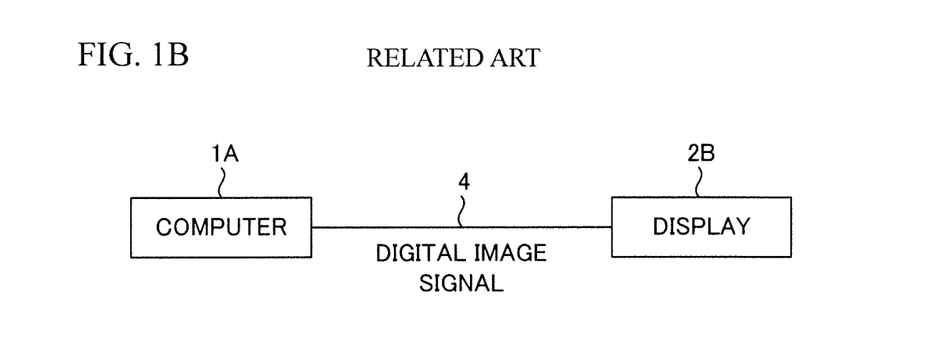

FIGS. 1A and 1B are diagrams illustrating the configuration of a system including a computer and a display. In FIG. 1A, a computer 1A outputs an analog image signal (e.g. an analog RGB signal) to a display 2A (e.g. a LCD (Liquid Crystal Display)) via an analog signal cable 3. The deterioration of a signal level and the deviation of display timing (i.e., the deviation of sampling timing when digital sampling of the analog image signal is performed) occur in the analog image signal due to a loss in a transmission path. Such a deterioration of the signal level and such a deviation of the display timing directly influence an image quality, and the blur, the flicker and the deviation of the image occur. To correct the blur, the flicker and the deviation of the image, the display 2A includes an image quality adjustment function.

In FIG. 1B, the computer 1A outputs a digital image signal (e.g. a DVI (Digital Visual Interface) signal or a HDMI (trade mark) (High-Definition Multimedia Interface) signal) to a display 2B (e.g. the LCD) via a digital signal cable 4. In the transmission of the digital image signal, the computer 1A also transmits information on a field angle to the display 2B, and therefore the blur, the flicker and the deviation of the image which influence the image quality do not occur. For this reason, the display 2B does not include the image quality adjustment function.

Figure 2A:
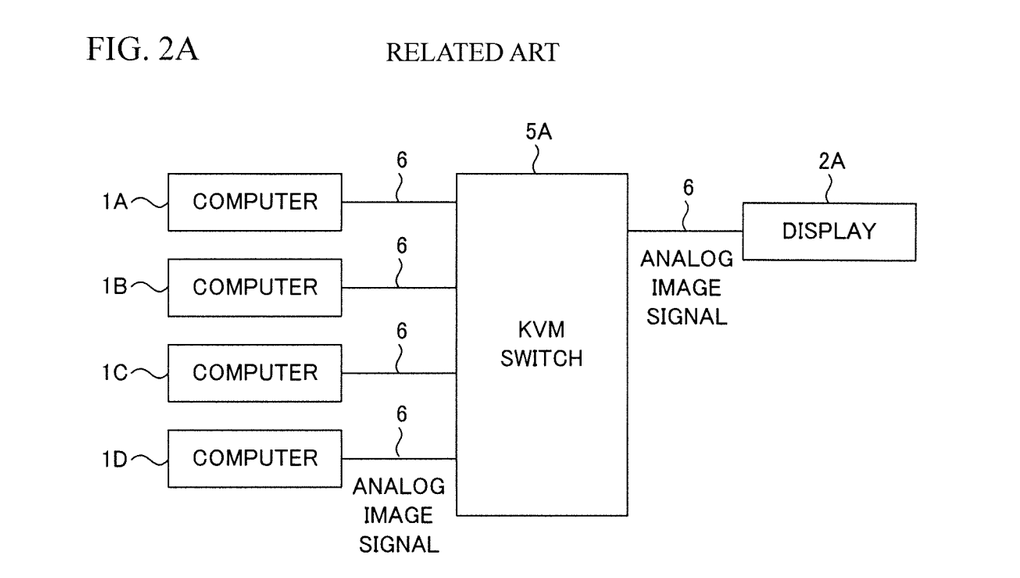
FIGS. 2A and 2B are diagrams illustrating the configuration of a system including computers, the display and a KVM switch.
Figure 2B:
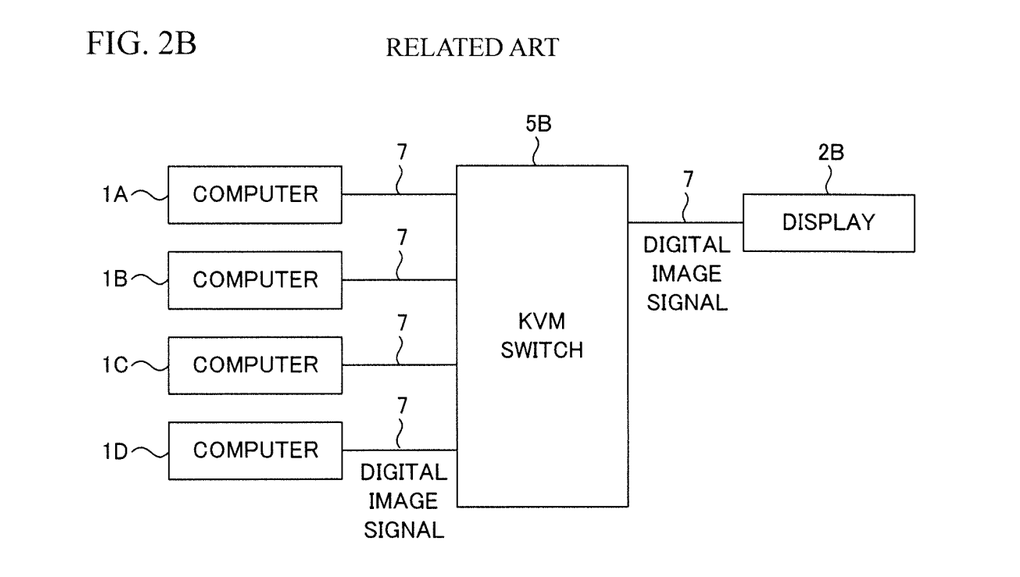

FIGS. 2A and 2B are diagrams illustrating the configuration of a system including computers, the display and a KVM switch. In FIG. 2A, a KVM switch 5A (e.g. an analog KVM switch) selects a computer to be connected to the display 2A from computers 1A to 1D. An analog image signal from the selected computer is output to the display 2A via the KVM switch 5A and an analog signal cable 6. In this case, the deterioration of the signal level and the deviation of the display timing occur due to the loss in the KVM switch 5A and the analog signal cable 6. However, the display 2A includes the image quality adjustment function, and the display 2A therefore can adjust the image quality of the analog image signal to be displayed.

However, when the KVM switch 5A is used, a plurality of transmission paths exist between the computers 1A to 1D and the display 2A. On the contrary, the display 2A includes only an adjustment value for performing the image quality adjustment corresponding to a single transmission path. Therefore, whenever the KVM switch 5A switches the computer, an operator needs to adjust the image quality of the analog image signal with the use of the image quality adjustment function of the display 2A.

In FIG. 2B, a KVM switch 5B (e.g. a digital KVM switch) selects a computer to be connected to the display 2B from the computers 1A to 1D. A digital image signal from the selected computer is output to the display 2B via the KVM switch 5B and a digital signal cable 7. In this case, each of the computers 1A to 1D transmits the information on the field angle in addition to the digital image signal to the display 2B, and therefore the blur, the flicker and the deviation of the image which influence the image quality do not occur. For this reason, the display 2B does not include the image quality adjustment function.

Moreover, there has been conventionally known a KVM switch that receives a reference signal and adjusts the distortion of a video signal (e.g. see Patent Document 1).

PRIOR ART DOCUMENT

[Patent Document 1] Japanese Laid-open Patent Publication No. 2008-129908

Figure 3:
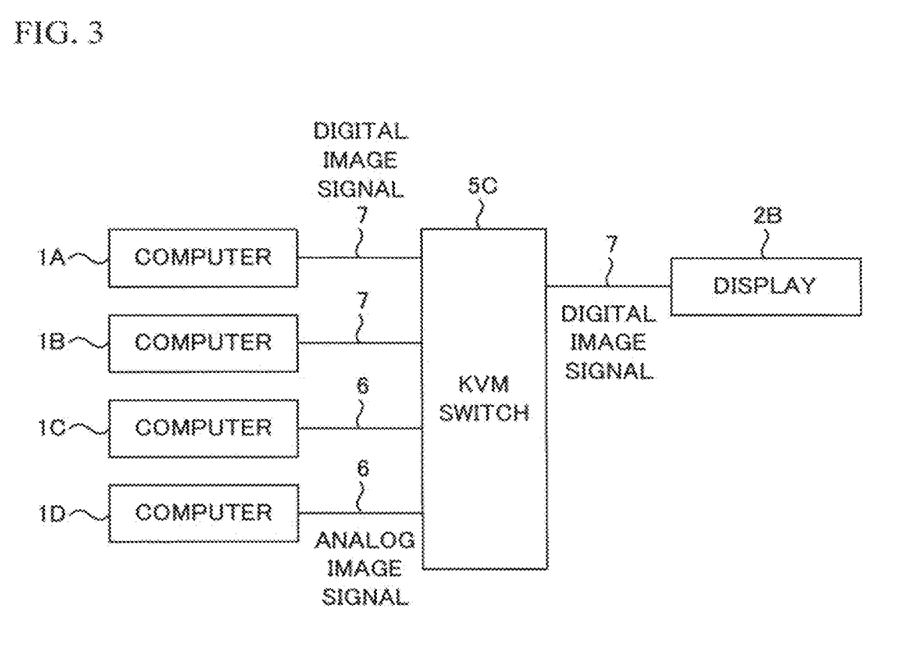
FIG. 3 is a diagram illustrating the configuration of a system including the computers, the display and a KVM switch.

FIG. 3 is a diagram illustrating the configuration of a system including the computers, the display and a KVM switch. A KVM switch 5C is an analog/digital KVM switch, is connected to the computers 1A and 1B and the display 2B via the digital signal cables 7, and is connected to the computers 1C and 1D via the analog signal cables 6. The digital image signals are output from the computers 1A and 1B, and the analog image signals are output from the computers 1C and 1D. The display 2B does not include the image quality adjustment function. In this case, each of the computers 1A and 1B transmits the information on the field angle in addition to the digital image signal to the display 2B, and therefore the blur, the flicker and the deviation of the image which influence the image quality do not occur.

However, each of the computers 1C and 1D does not transmit the information on the field angle to the display 2B, and therefore the blur, the flicker and the deviation of the image which influence the image quality occur. Then, the display 2B does not include the image quality adjustment function, and hence cannot adjust the image quality of the analog image signal.

Even when the display 2B includes the image quality adjustment function, whenever the computer to be operated is switched to another computer outputting the analog image signal, the operator needs to adjust the image quality of the analog image signal with the use of the image quality adjustment function of the display 2B. For this reason, whenever the computer to be operated is switched to another computer outputting the analog image signal, the operator has to perform a complicated operation for image quality adjustment.

SUMMARY OF THE INVENTION

It is an object of the present invention to provide a KVM switch that can perform suitable image quality adjustment whenever a computer to be operated is switched to another computer outputting an analog image signal.

To achieve the above-mentioned object, a KVM (K: keyboard, V: Video, M: Mouse) switch connectable between a plurality of computers and a display, including: a plurality of input terminals that input analog image signals from the computers, respectively; a storage that stores an adjustment value that adjusts an image quality of each of the analog image signals for each input terminal; a processor that selects any one of the plurality of input terminals in accordance with an operation of a keyboard; and an adjustment circuit that adjusts the image quality of an analog image signal input to the selected input terminal based on the adjustment value corresponding to the selected input terminal.

According to the present invention, it is possible to perform suitable image quality adjustment whenever a computer to be operated is switched to another computer outputting an analog image signal.

DETAILED DESCRIPTION

Hereinafter, a description will be given of embodiments of the present invention with reference to drawings.

Figure 4:
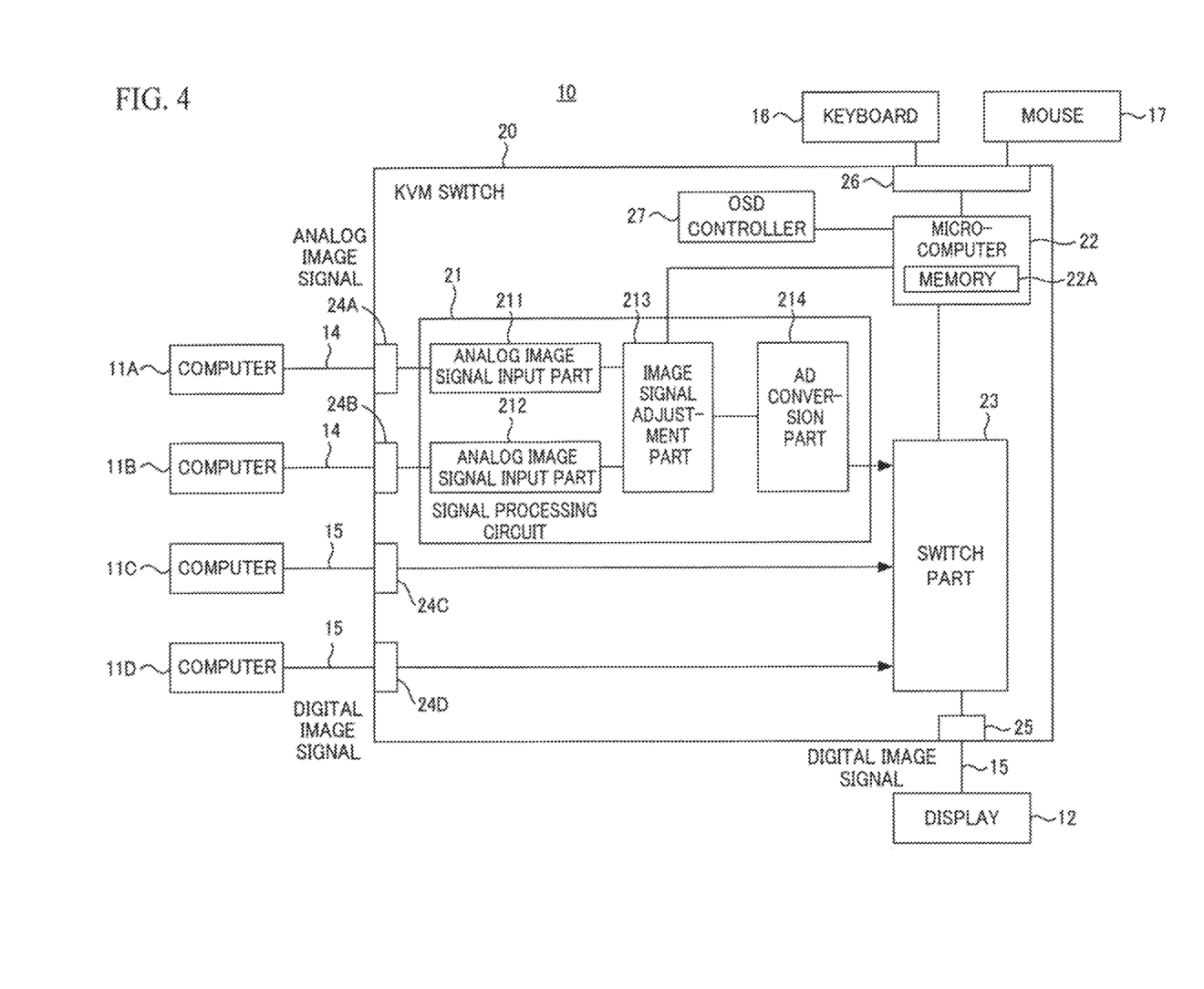
FIG. 4 is a diagram illustrating the configuration of a system including computers, a display and a KVM switch according to the present embodiment.

FIG. 4 is a diagram illustrating the configuration of a system including computers, a display and a KVM (K: keyboard, V: video, M: mouse) switch according to the present embodiment.

In FIG. 4, a system 10 includes computers 11A to 11D, a display 12 and a KVM switch 20. Here, the display 12 may include an image quality adjustment function to adjust an image quality of an analog image signal, but does not need to include the image quality adjustment function. The computers 11A and 11B output analog image signals, and the computers 11C and 11D output digital image signals.

The KVM switch 20 is an analog/digital KVM switch. The KVM switch 20 includes a signal processing circuit 21, a microcomputer 22, a switch part 23, analog image input terminals 24A and 24B, digital image input terminals 24C and 24D, a digital image output terminal 25, a serial signal input terminal 26, and an OSD (On-Screen Display) controller 27. The microcomputer 22 is connected to the signal processing circuit 21, the switch part 23, the serial signal input terminal 26 and the OSD controller 27. The analog image input terminals 24A and 24B are connected to the computers 11A and 11B via analog signal cables 14, respectively. The digital image input terminals 24C and 24D are connected to the computers 11C and 11D via digital signal cables 15, respectively. The digital image output terminal 25 is connected to the display 12 via the digital signal cable 15. A keyboard 16 and a mouse 17 are connected to the serial signal input terminal 26. The analog image input terminals 24A and 24B serve as an input means that inputs the analog image signal, and the digital image input terminals 24C and 24D (e.g. DVI-D terminals) serve as a first input means that inputs the digital image signal. The switch part 23 serves as a switch means that switches an output source of the digital image signal to any one of the digital image input terminal 24C, 24D or the signal processing circuit 21 (i.e., an AD conversion part 214 described later). The microcomputer 22 serves as a selection means and a setting means. Here, the analog image input terminals 24A and 24B may be a shared input terminal (e.g. a DVI-I terminal) that inputs the analog image signal and the digital image signal.

The signal processing circuit 21 adjusts the image quality of the analog image signal input from the computer, and converts the analog image signal into the digital image signal. The signal processing circuit 21 includes: analog image signal input parts 211 and 212 that input the analog image signals from the computers 11A and 11B via the analog image input terminals 24A and 24B; an image signal adjustment part 213 that adjusts the image quality of the analog image signal; and an analog-digital (AD) conversion part 214 that converts the analog signal having the adjusted image quality into the digital image signal. The digital image signal converted by the AD conversion part 214 is output to the display 12 via the switch part 23 and the digital image output terminal 25. The image signal adjustment part 213 serves as an adjustment means, and the AD conversion part 214 serves as a conversion means.

Figure 5:
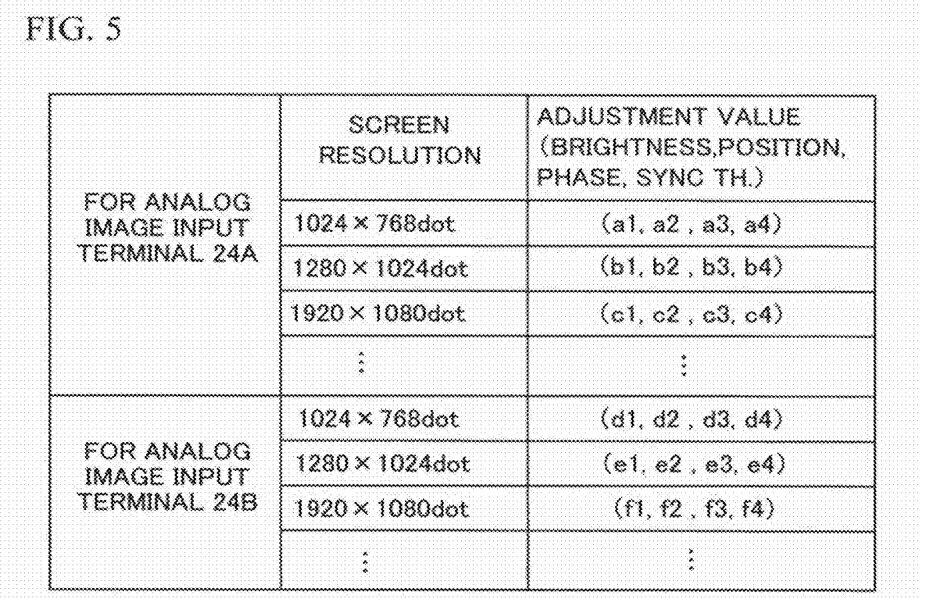
FIG. 5 is a diagram illustrating an example of adjustment values stored into a memory.

The microcomputer 22 controls the whole operation of the KVM switch 20, especially, controls a switching operation of a signal path of the switch part 23. The microcomputer 22 includes a memory 22A that stores the adjustment values that adjusts the image quality of the analog image signal for each computer outputting the analog image signal (i.e., for each analog image input terminal) and for each screen resolution. The memory 22A serves as a storage means. FIG. 5 is a diagram illustrating an example of the adjustment values stored into the memory 22A. Here, the adjustment values are described later.

Moreover, when the computer to be operated is switched to the computer 11A or 11B outputting the analog image signal and in the case of an analog setting, the microcomputer 22 outputs the adjustment value corresponding to the switched computer stored into the memory 22A to the image signal adjustment part 213, and controls the switching operation of the signal path of the switch part 23. Here, when the computer to be operated is switched to the computer 11C or 11D outputting the digital image signal, the microcomputer 22 controls the switching operation of the signal path of the switch part 23, but does not output the adjustment value stored into the memory 22A to the image signal adjustment part 213. This is because the computer 11C or 11D transmits information on a field angle in addition to the digital image signal to the display 12, and therefore the image quality adjustment by the image signal adjustment part 213 is unnecessary. The switch part 23 switches a reception path of the image signal to be displayed on the display 12 in accordance with a switching instruction from the microcomputer 22.

The OSD controller 27 outputs a setting screen for performing various settings of the KVM switch to the display 12 depending on an input of a hot key (e.g. a function key and a "1" key) from the keyboard 16 and the mouse 17. In the setting screen, an operator can set the adjustment value that adjusts the image quality of the analog image signal for each computer (i.e., for each transmission path of the analog image signal or for each analog image input terminal). The kinds of the adjustment value are described later.

Figure 6A:
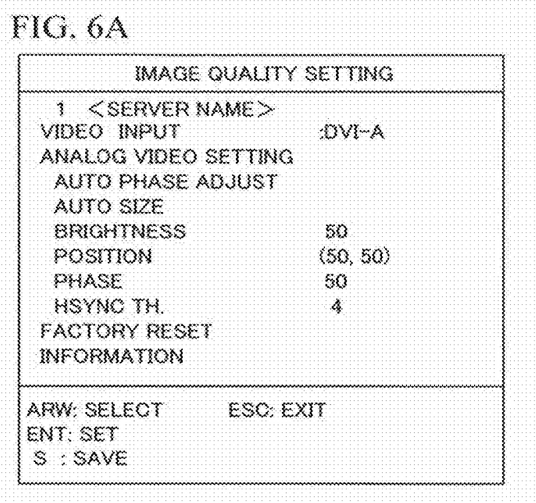
FIG. 6A is a diagram illustrating an example of an image quality setting screen.
Figure 6B:
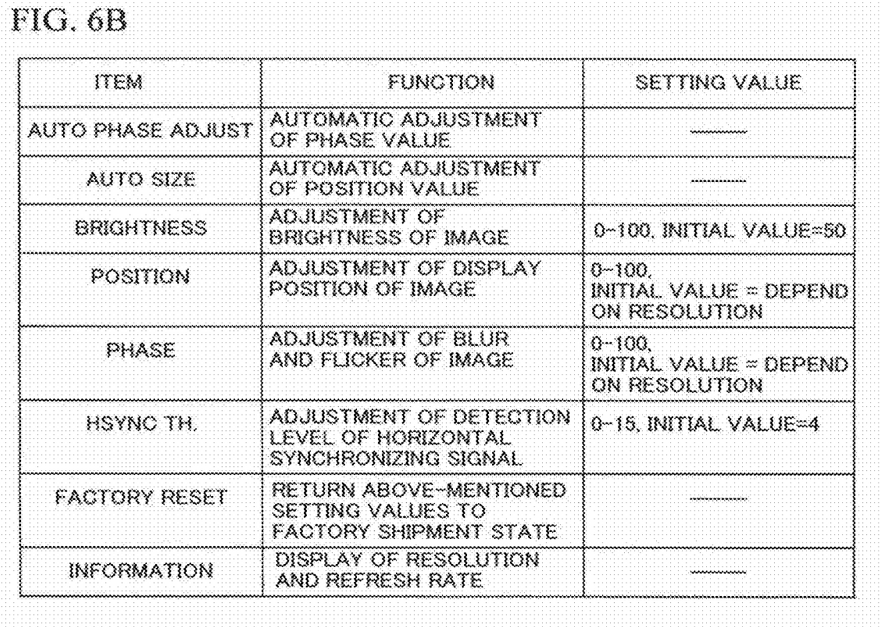
FIG. 6B is a diagram illustrating a concrete example of an adjustment value adjusted by the image quality setting screen.

FIG. 6A is a diagram illustrating an example of an image quality setting screen. FIG. 6B is a diagram illustrating a concrete example of the adjustment value adjusted by the image quality setting screen. In FIG. 6B, the adjustment value adjusted by the image quality setting screen includes an item, a function and a setting value.

In the item of "VIDEO INPUT" of FIG. 6A, it is set whether a signal to be input to a corresponding port is digital or analog. When the item of "AUTO PHASE ADJUST" of FIG. 6A is selected, the microcomputer 22 automatically adjusts the blur and the flicker of the image, i.e., a PHASE value. When the item of "AUTO SIZE" is selected, the microcomputer 22 automatically adjusts an image display position, i.e., a POSITION value.

When the item of "BRIGHTNESS" of FIG. 6A is selected, it is possible to adjust the brightness of the image on the display 12. The setting value of the "BRIGHTNESS" is 0 to 100, and an initial value is 50. For example, the smaller the setting value, the darker the image. The larger the setting value, the brighter the image. The setting value of the "BRIGHTNESS" is stored into the memory 22A for each analog image input terminal. The setting value of the "BRIGHTNESS" is transmitted from the microcomputer 22 to the image signal adjustment part 213, and the image signal adjustment part 213 adjusts the brightness of the analog image in accordance with the transmitted setting value of the "BRIGHTNESS".

When the item of "POSITION" of FIG. 6A is selected, it is possible to adjust the display position of the image on the display 12. The setting value of the "POSITION" includes a first setting value for moving the image upward and downward, and a second setting value for moving the image rightward and leftward. Each of these setting values is 0 to 100, and the initial value thereof is changed depending on a resolution. The setting values of the "POSITION" is transmitted from the microcomputer 22 to the image signal adjustment part 213, and the image signal adjustment part 213 adjusts the display position of the image on the screen in accordance with the transmitted setting value of the "POSITION".

When the item of "PHASE" of FIG. 6A is selected, it is possible to adjust the blur and the flicker of the image on the display 12. The setting values of the "PHASE" is 0 to 100, and the initial value is changed depending on the resolution. The setting values of the "PHASE" is transmitted from the microcomputer 22 to the image signal adjustment part 213, and the image signal adjustment part 213 adjusts a phase of a dot clock which prescribes a timing to sample an analog image signal in accordance with the transmitted setting value of the "PHASE" to adjust the blur and the flicker of the image.

When the item of "HSYNC TH." of FIG. 6A is selected, a detection level of a horizontal synchronizing signal is adjusted. Specifically, the signal processing circuit 21 inputs the horizontal synchronizing signal from the computer outputting the analog image signal. However, in this case, an input level (an input voltage) of the horizontal synchronizing signal is lower than a threshold value depending on the computer, and there is a case where the horizontal synchronizing signal cannot be detected precisely. For this reason, in the item of the "HSYNC TH.", the threshold value for detecting the horizontal synchronizing signal is adjusted. The setting values of the "HSYNC TH." is 0 to 15, and the initial value is 4. The setting values of the "HSYNC TH." is transmitted from the microcomputer 22 to the image signal adjustment part 213, and the image signal adjustment part 213 adjusts the detection level of the horizontal synchronizing signal in accordance with the transmitted setting value of the "HSYNC TH."

When the item of "FACTORY RESET" of FIG. 6A is selected, the setting values of the "BRIGHTNESS", the "POSITION", the "PHASE" and the "HSYNC TH." are returned to factory default values. In the item of the "FACTORY RESET", a current resolution and a current refresh rate are displayed.

Here, the adjustment value adjusted by the image quality setting screen may preferably include at least one of the "AUTO PHASE ADJUST", the "AUTO SIZE", the "BRIGHTNESS", the "POSITION", the "PHASE" and the "HSYNC TH.". Moreover, the setting of the adjustment value adjusted by the image quality setting screen is performed by the microcomputer 22 receiving the operation content of the keyboard 16.

Figure 7:
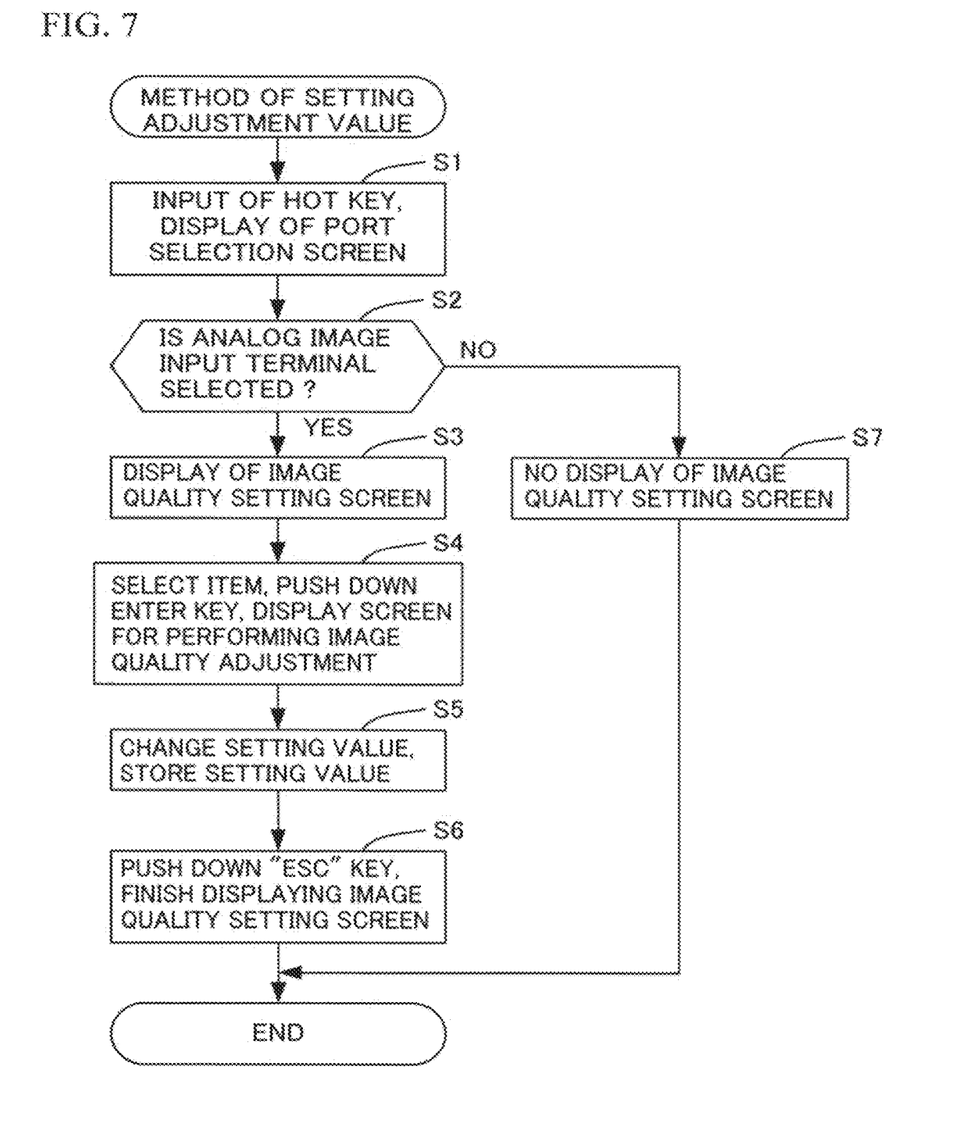
FIG. 7 is a flowchart illustrating a method of setting the adjustment value by the image quality setting screen.

FIG. 7 is a flowchart illustrating a method of setting the adjustment value by the image quality setting screen.

First, when the operator inputs a predetermined hot key from the keyboard 16, a port selection screen (not shown) is called from the OSD controller 27 and displayed on the display 12 (step S1). The port selection screen is a screen for selecting any one of the analog image input terminals 24A, 24B and the digital image input terminals 24C, 24D, i.e., a screen for selecting any one of an analog port or a digital port. Here, selecting any one of the analog image input terminals 24A, 24B and the digital image input terminals 24C, 24D is performed by the microcomputer 22 receiving the operation content of the keyboard 16.

When any one of the digital image input terminals 24C, 24D is selected in the port selection screen (NO in step S2), the image quality setting screen of FIG. 6A is not displayed on the display 12 (step S7). When any one of the analog image input terminals 24A, 24B is selected (YES in step S2), the image quality setting screen of FIG. 6A is called from the OSD controller 27 and displayed on the display 12 (step S3).

When the operator selects the item from the displayed image quality setting screen by the operation of cursor keys of the keyboard 16 and pushes down an enter key, a screen for performing the image quality adjustment of the selected item (i.e., a screen in which an image of the image quality setting screen is overlapped onto the converted digital image signal) is displayed on the display 12 (step S4). When the operator changes the setting value on the screen by the operation of the cursor keys and push down an "S" key, the setting value is stored into the memory 22A (step S5). The operator repeats the processing of steps S4 and S5 to store the above-mentioned various setting values. Finally, when an "ESC" key is pushed down, displaying the image quality setting screen of FIG. 6A is finished (step S6).

Figure 8:
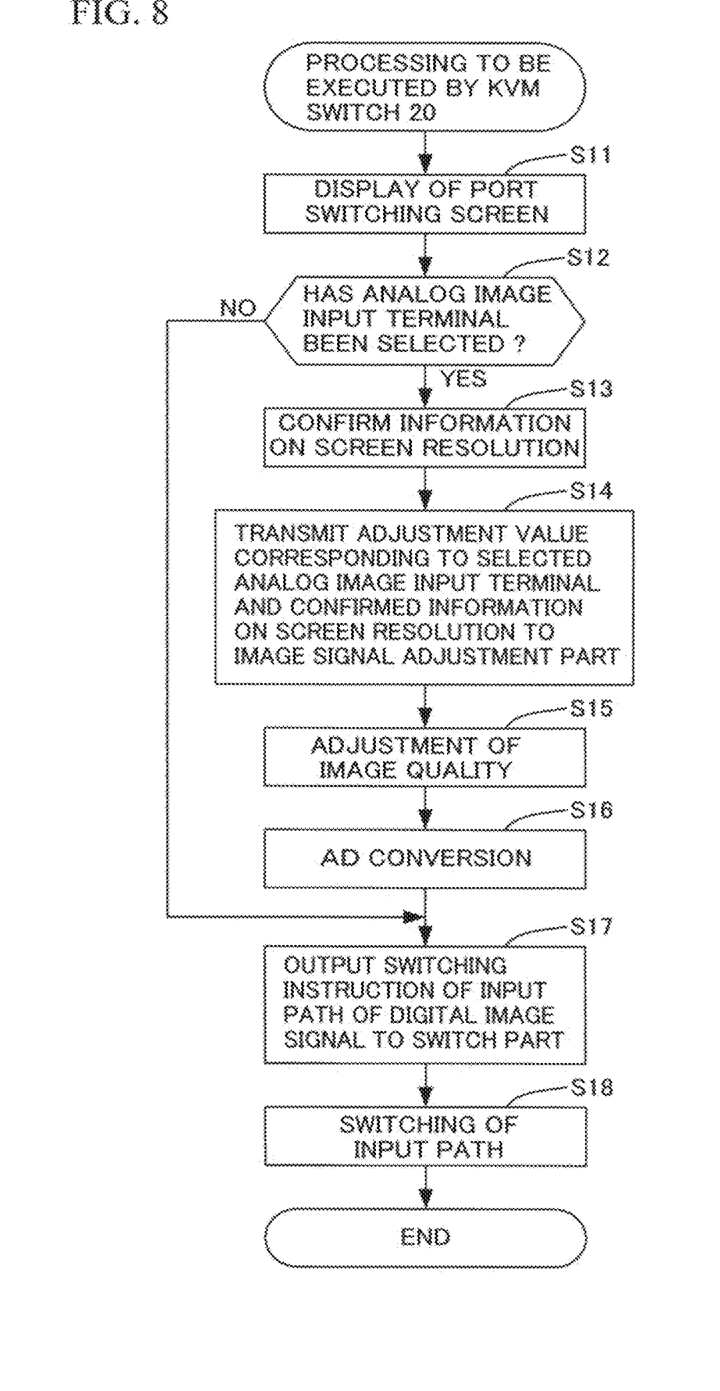
FIG. 8 is a flowchart illustrating processing to be executed by the KVM switch.

FIG. 8 is a flowchart illustrating processing to be executed by the KVM switch 20.

First, when a predetermined hot key for switching the computer is input from the keyboard 16, a port switching screen (not shown) is called from the OSD controller 27 and displayed on the display 12 (step S11).

The microcomputer 22 determines whether the analog image input terminal (24A or 24B) has been selected as a port of a switching destination (step S12). When the digital image input terminal has been selected as the port of the switching destination (NO in step S12), the procedure advances to step S17 described later. On the other hand, when the analog image input terminal has been selected as the port of the switching destination (YES in step S12), the microcomputer 22 confirms information on a screen resolution of the display 12 (step S13). The information on the screen resolution of the display is acquired beforehand from the display by the microcomputer 22, and is used for the storage of the adjustment values as illustrated in FIG. 5.

The microcomputer 22 reads the adjustment value corresponding to the selected analog image input terminal and the confirmed information on the screen resolution from the memory 22A, and transmits the read adjustment value to the image signal adjustment part 213 (step S14). The image signal adjustment part 213 receives the adjustment value from the microcomputer 22 performs the image quality adjustment on the analog image signal with use of the received adjustment value (step S15). The AD conversion part 214 converts the analog image signal in which the image quality has been adjusted, into the digital image signal (step S16).

The microcomputer 22 outputs the switching instruction of an input path of the digital image signal to the switch part 23 in accordance with the selected analog image input terminal (step S17). The switch part 23 switches the input path of the image signal in accordance with the switching instruction (step S18). In this case, the switch part 23 selects the input path connected to the AD conversion part 214 (i.e., the signal processing circuit 21) as the input path of the image signal. Thereby, the converted digital image signal is displayed on the display 12 via the switch part 23.

As described above, according to the present embodiment, the KVM switch 20 includes: the analog image input terminals 24A and 24B that input the analog image signals from the computers 11A and 11B, respectively; the memory 22A that stores the adjustment value that adjusts the image quality of each of the analog image signals for each analog image input terminal; the microcomputer 22 that selects any one of the analog image input terminals 24A and 24B in accordance with the operation of the keyboard 16; and the image signal adjustment part 213 that adjusts the image quality of the analog image signal input to the selected analog image input terminal based on the adjustment value corresponding to the selected analog image input terminal. Therefore, whenever any one of the analog image input terminals is selected, i.e., whenever the computer to be operated is switched to another computer outputting the analog image signal, it is possible to perform suitable image quality adjustment. Moreover, whenever the computer to be operated is switched to the another computer outputting the analog image signal, the operator does not need to perform a complicated operation for the image quality adjustment.

In the present embodiment, the KVM switch 20 is the analog/digital KVM switch, but may be an analog KVM switch that inputs only the analog image signal. Moreover, the number of computers, analog image input terminals, digital image input terminals and digital image output terminals is not limited to an example of FIG. 4.

The present invention is not limited to these specifically described embodiments but may have various variations and alterations within the scope of the claimed invention.

The invention claimed is:

1. A KVM (K: keyboard, V: Video, M: Mouse) switch connectable between a plurality of computers and a display, comprising:
a plurality of input terminals that input analog image signals from the computers, respectively;
a storage that stores a plurality of adjustment values that adjusts an image quality of the analog image signals respectively, a plurality of the adjustment values stored for each of the plurality of input terminals and for each screen resolution of the display;
a processor that confirms screen resolution of the display, selects one of the plurality of input terminals in accordance with an operation of a keyboard, and reads one of the plurality of adjustment values corresponding to the one of the plurality of input terminals and the screen resolution from the storage; and
an adjustment circuit that adjusts the image quality of one of the analog image signals input to the one of the plurality of input terminals based on the one of the plurality of adjustment values read by the processor.

2. The KVM switch according to claim 1, wherein each of the plurality of adjustment values includes at least one of a first adjustment value that adjusts brightness of an image, a second adjustment value that adjusts a display position of the image on the display, a third adjustment value that adjusts blur and flicker of the image on the display, and a fourth adjustment value that adjusts a detection level of a horizontal synchronizing signal.

3. The KVM switch according to claim 1, further comprising:
a first input terminal that inputs a digital image signal from a computer;
a converter that converts an analog image signal adjusted by the adjustment circuit into a digital image signal; and
a switch that, when one of the input terminal and the first input terminal is selected by the processor, switches a output source of the digital image signal to be displayed on the display to the selected input terminal or the selected first input terminal in accordance with a result of the selection.

4. The KVM switch according to claim 1, wherein the processor sets each of the plurality of adjustment values for each input terminal.

5. A KVM (K: keyboard, V: Video, M: Mouse) switch connectable between a plurality of computers and a display, comprising:
a first input terminal that receives an input of an analog image signal from any one of the computers;
a storage that stores a plurality of adjustment values that adjust an image quality of the analog image signal, a plurality of the adjustment value stored for each screen resolution of the display;
an adjustment circuit that adjusts the image quality of the analog image signal input from the first input terminal;
a converter that converts the analog image signal adjusted by the adjustment circuit into a digital image signal;
a second input terminal that receives an input of a digital image signal from any one of the computers;
a processor that receives an operation selecting any one of the first input terminal and the second input terminal; and
a switch that switches an output source of the digital image signal to be displayed on the display to any one of the converter and the second input terminal in accordance with a selection operation by the processor, wherein
the processor confirms the screen resolution of the display and reads one of the plurality of adjustment values corresponding to the screen resolution from the storage, and
the adjustment circuit adjusts the quality of the analog signal based on the one of the plurality of adjustment values read by the processor.

* * * * *